US012625032B2

(12) United States Patent
Chandrasekaran et al.

(10) Patent No.: US 12,625,032 B2
(45) Date of Patent: May 12, 2026

(54) IMAGE-BASED BEARING FAILURE DETECTION

(71) Applicant: Schaeffler Technologies AG & Co. KG, Herzogenaurach (DE)

(72) Inventors: Balaji Chandrasekaran, Charlotte, NC (US); Rudoniel Correa Cury, Sao Paulo (BR); Gustavo dos Santos Gioria, Sorocaba (BR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/672,408

(22) Filed: May 23, 2024

(65) Prior Publication Data

US 2025/0362203 A1     Nov. 27, 2025

(51) Int. Cl.
*G01M 13/04* (2019.01)
*G01N 21/88* (2006.01)

(52) U.S. Cl.
CPC ........ *G01M 13/04* (2013.01); *G01N 21/8851* (2013.01); *G01N 2021/8854* (2013.01); *G01N 2021/8887* (2013.01)

(58) Field of Classification Search
CPC .............. G01M 13/04; G01N 21/8851; G01N 2021/8883; G01N 2021/8887; G01N 2021/8854; G06T 7/001; G06T 2207/20081
USPC .......................................................... 348/92
See application file for complete search history.

(56) References Cited

U.S. PATENT DOCUMENTS

| | | | | |
|---|---|---|---|---|
| 9,618,037 B2 * | 4/2017 | Kar | ..................... | G01M 13/045 |
| 2013/0162810 A1 * | 6/2013 | Wu | ....................... | G01N 21/952 |
| | | | | 348/92 |
| 2020/0297219 A1 * | 9/2020 | Mitra | ................... | A61B 8/5223 |
| 2024/0085274 A1 * | 3/2024 | Niu | ...................... | G01M 13/045 |
| 2024/0377283 A1 * | 11/2024 | Chennaoui | ............. | G06T 7/001 |
| 2025/0121862 A1 * | 4/2025 | Griffis | .................. | G06T 7/0002 |
| 2025/0156774 A1 * | 5/2025 | Barole | .............. | G06V 30/1429 |

FOREIGN PATENT DOCUMENTS

WO     WO-2024086771 A1 *    4/2024    ............. G06N 3/096

OTHER PUBLICATIONS

Evolution, "The Future of Bearing Failure Analysis is Here," Mar. 2, 2022, 4 pages, https://evolution.skf.com/the-future-of-bearing-failure-analysis-is-here/.

* cited by examiner

*Primary Examiner* — Thai Q Tran
(74) *Attorney, Agent, or Firm* — Suiter Swantz IP

(57) ABSTRACT

A device may receive, from a front-end device communicatively coupled to the back-end device, one or more images of a bearing. A device may identify a number of defects of one or more defect classes on the bearing based on the one or more images using a deep learning classifier, wherein the deep learning classifier is trained on training data including a plurality of images of training bearings with identified defects in the one or more defect classes. A device may generate defect data associated with the defects identified on the bearing when the number of defects identified on the bearing is at least one. A device may direct the front-end device to display the defect data on a display device.

17 Claims, 12 Drawing Sheets

BEARING INSPECTION SYSTEM 100

DATASET BALANCED

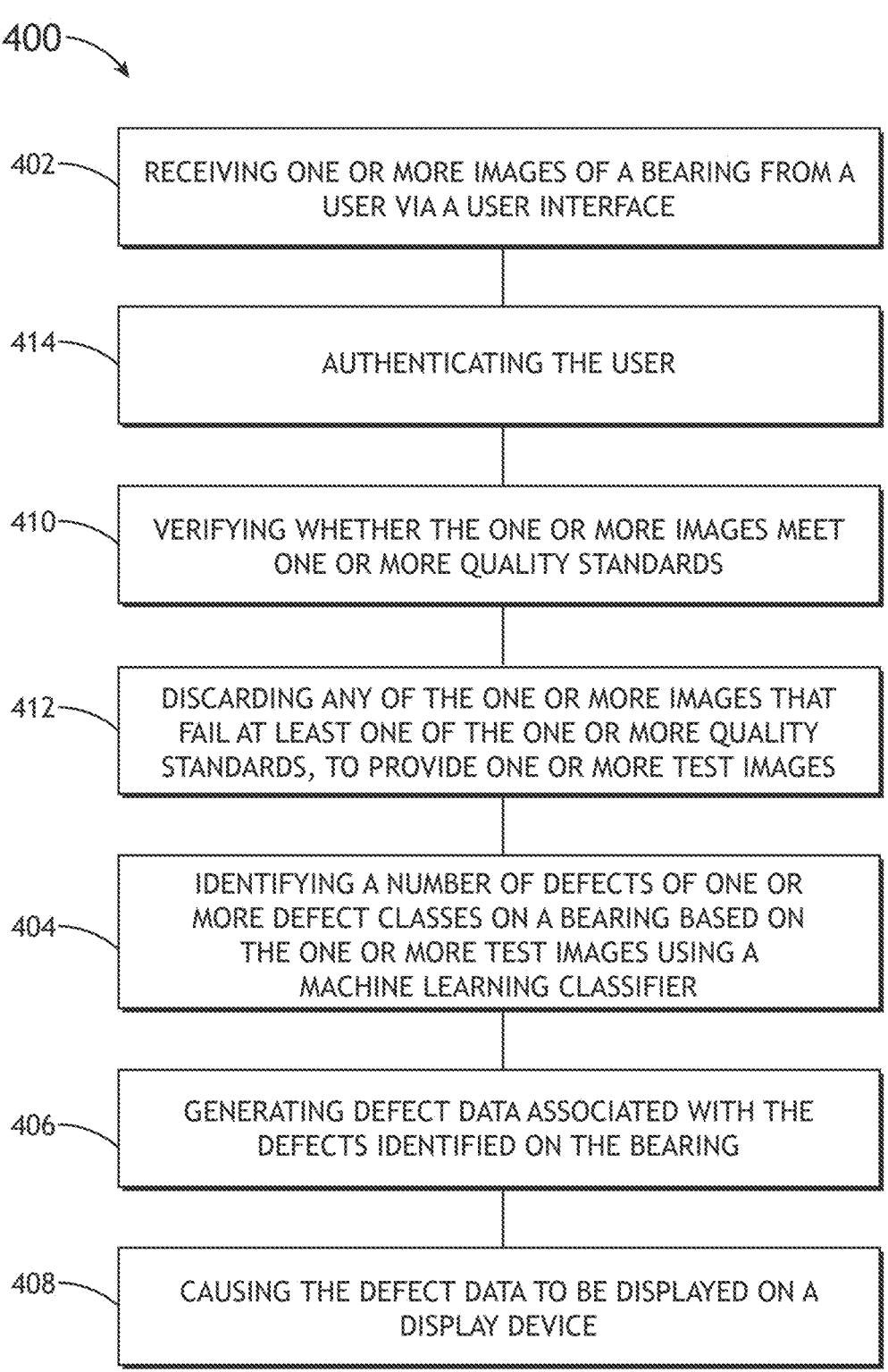

400

402 — RECEIVING ONE OR MORE IMAGES OF A BEARING FROM A USER VIA A USER INTERFACE

414 — AUTHENTICATING THE USER

410 — VERIFYING WHETHER THE ONE OR MORE IMAGES MEET ONE OR MORE QUALITY STANDARDS

412 — DISCARDING ANY OF THE ONE OR MORE IMAGES THAT FAIL AT LEAST ONE OF THE ONE OR MORE QUALITY STANDARDS, TO PROVIDE ONE OR MORE TEST IMAGES

404 — IDENTIFYING A NUMBER OF DEFECTS OF ONE OR MORE DEFECT CLASSES ON A BEARING BASED ON THE ONE OR MORE TEST IMAGES USING A MACHINE LEARNING CLASSIFIER

406 — GENERATING DEFECT DATA ASSOCIATED WITH THE DEFECTS IDENTIFIED ON THE BEARING

408 — CAUSING THE DEFECT DATA TO BE DISPLAYED ON A DISPLAY DEVICE

FIG.4

IMAGE-BASED BEARING FAILURE DETECTION

TECHNICAL FIELD

The present disclosure relates generally to defect detection in bearings and, more particularly, to image-based defect detection using deep learning techniques.

BACKGROUND

Mechanical bearings are a critical component of many systems. Defects in such bearings may lead to numerous undesirable effects such as, but not limited to, undesirable acoustic signals (e.g., sounds), undesirable vibrations, increased mechanical wear, or a point of failure. It may therefore be desirable to identify and/or classify bearing defects during a manufacturing process (e.g., on a shop floor). However, typical techniques for defect identification and classification rely on manual inspection of bearings and/or images of bearings, which is time consuming and prone to error. There is therefore a need to develop systems and methods for curing the above deficiencies.

SUMMARY

In embodiments, the techniques described herein relate to a system for defect inspection including a back-end device including one or more processors configured to execute program instructions stored in a memory device, where the program instructions are configured to cause the one or more processors to receive, from a front-end device communicatively coupled to the back-end device, one or more images of a bearing; identify one or more defects in one or more defect classes on the bearing based on the one or more images using a deep learning classifier, where the deep learning classifier is trained on training data including a plurality of images of training bearings, where at least some of the plurality of images of the training bearings include defects known to be associated with the one or more defect classes; generate defect data associated with at least one of the one or more defects identified on the bearing; and direct the front-end device to display the defect data on a display device.

In embodiments, the techniques described herein relate to a system for defect inspection, where the front-end device includes at least one of a mobile device, a tablet, or a personal computer; where the back-end device includes a server.

In embodiments, the techniques described herein relate to a system for defect inspection, where the defect data includes a number of defects identified in at least one of the one or more defect classes.

In embodiments, the techniques described herein relate to a system for defect inspection, where the defect data includes an annotated image indicating at least locations of the defects identified on the bearing.

In embodiments, the techniques described herein relate to a system for defect inspection, where the defect data includes a probability of at least one of the one or more defects identified on the bearing belonging to at least one of the one or more defect classes.

In embodiments, the techniques described herein relate to a system for defect inspection, where the defect data includes a root cause associated with at least one of the one or more defects identified on the bearing.

In embodiments, the techniques described herein relate to a system for defect inspection, where the defect data includes a mitigation technique for mitigating fabrication of at least one of the one or more defects identified on the bearing.

In embodiments, the techniques described herein relate to a system for defect inspection, where the deep learning classifier is trained with at least one of a supervised learning technique or a semi-supervised learning technique.

In embodiments, the techniques described herein relate to a system for defect inspection, where the program instructions are further configured to cause the one or more processors to verify whether the one or more images meet one or more quality standards, where one or more test images include any of the one or more images that pass the one or more quality standards; where identify the one or more defects in the one or more defect classes on the bearing based on the one or more images using the deep learning classifier includes identify the one or more defects in the one or more defect classes on the bearing based on the one or more test images using the deep learning classifier.

In embodiments, the techniques described herein relate to a system for defect inspection, where at least one of the one or more quality standards include an image quality standard associated with at least one of contrast or blur.

In embodiments, the techniques described herein relate to a system for defect inspection, where at least one of the one or more quality standards include an object detection check.

In embodiments, the techniques described herein relate to a system for defect inspection, where detection of a face results in failure of the object detection check.

In embodiments, the techniques described herein relate to a system for defect inspection, where at least one of the one or more defect classes includes at least one of cracking, discoloration, false brinelling, fretting, flutting, indentation, pitting, rust, spalling, wear, or an overheating defect.

In embodiments, the techniques described herein relate to a system for defect inspection including one or more processors configured to execute program instructions stored in a memory device, where the program instructions are configured to cause the one or more processors to receive one or more images of a bearing from a user via a user interface communicatively coupled with the one or more processors; verify whether the one or more images meet one or more quality standards, where one or more test images includes any of the one or more images that pass the one or more quality standards; identify one or more defects in one or more defect classes on the bearing based on the one or more test images using a deep learning classifier, where the deep learning classifier is trained on training data including a plurality of images of training bearings, where at least some of the plurality of images of the training bearings include defects known to be associated with the one or more defect classes; generate defect data associated with at least one of the one or more defects identified on the bearing; and cause the defect data to be displayed on a display device.

In embodiments, the techniques described herein relate to a method for defect inspection including capturing, via a front-end device accessible to a user, one or more images of a bearing; identifying, with a back-end device, one or more defects in one or more defect classes on the bearing based on the one or more images using a deep learning classifier, where the deep learning classifier is trained on training data including a plurality of images of training bearings, where at least some of the plurality of images of the training bearings include defects known to be associated with the one or more defect classes; generating, with the back-end device, defect data associated with at least one of the one or more defects identified on the bearing; and causing the defect data to be displayed on a display device on the front-end device.

In embodiments, the techniques described herein relate to a method, where the front-end device includes at least one of a mobile device, a tablet, or a personal computer; where the back-end device includes a server.

In embodiments, the techniques described herein relate to a method, where the defect data includes at least one of a number of defects identified in at least one of the one or more defect classes; an annotated image indicating at least locations of the defects identified on the bearing; a probability of at least one of the one or more defects identified on the bearing belonging to at least one of the one or more defect classes; a root cause associated with at least one of the one or more defects identified on the bearing; or a mitigation technique for mitigating fabrication of at least one of the one or more defects identified on the bearing.

In embodiments, the techniques described herein relate to a method, where the deep learning classifier is trained with at least one of a supervised learning technique or a semi-supervised learning technique.

In embodiments, the techniques described herein relate to a method, further including verifying whether the one or more images meet one or more quality standards, where one or more test images includes any of the one or more images that pass the one or more quality standards; where identifying the one or more defects in the one or more defect classes on the bearing based on the one or more images using the deep learning classifier includes identifying the one or more defects in the one or more defect classes on the bearing based on the one or more test images using the deep learning classifier.

In embodiments, the techniques described herein relate to a method, where at least one of the one or more defect classes includes at least one of cracking, discoloration, false brinelling, fretting, indentation, pitting, rust, spalling, or an overheating defect.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

FIG. 4 illustrates a flow diagram illustrating steps performed in a method for identifying defects on a bearing using a deep learning classifier, in accordance with one or more embodiments of the present disclosure.

DETAILED DESCRIPTION

Figure 1A:
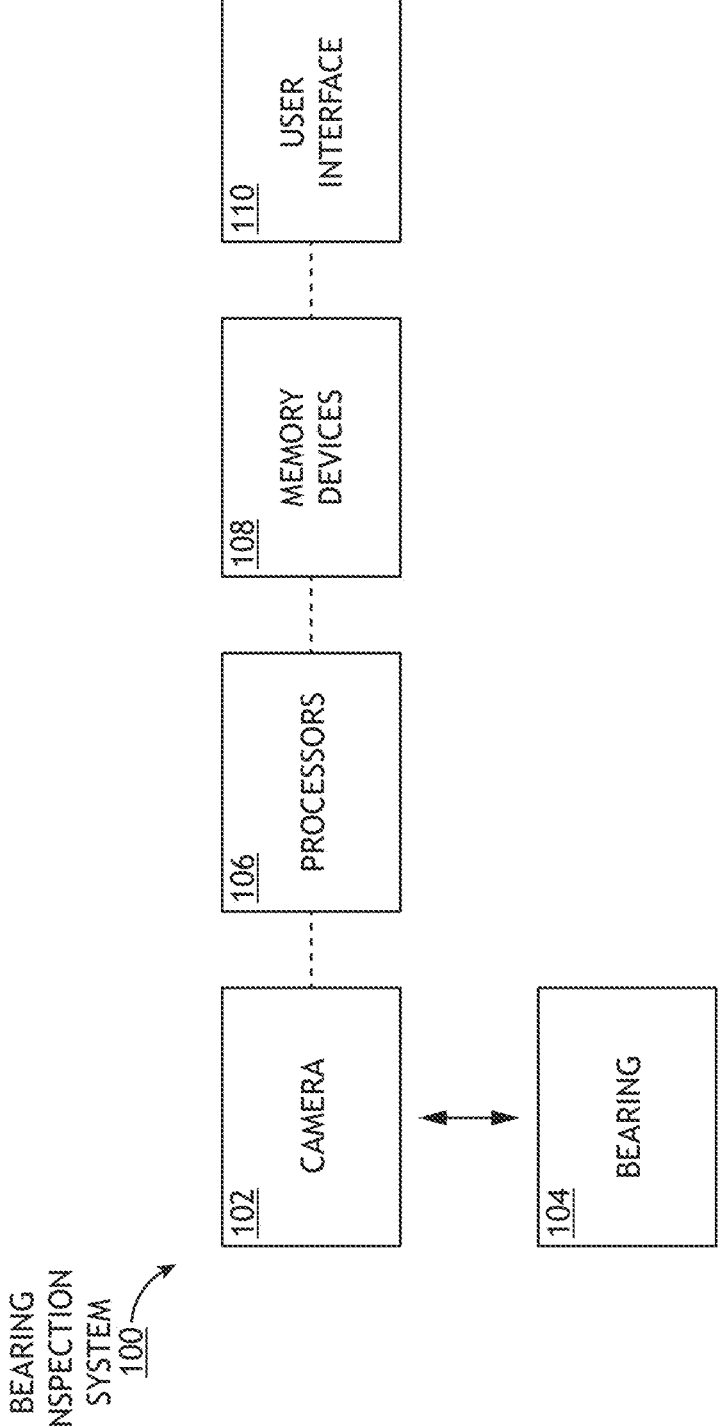
FIG. 1A illustrates a block diagram of a bearing inspection system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods providing image-based detection of defects in mechanical bearings using deep learning techniques (e.g., computer-vision-based deep learning techniques or machine learning techniques more generally). For example, a deep learning classifier may be trained on training data including images of known defects of different classes (e.g., different defect types) on bearings. As another example, a deep learning classifier may be trained on training data including images of bearings annotated by subject matter experts, which may include marking the location and type of defects found in the images. This image and annotation may provide accurate training data for the deep learning model, which may be suitable for a supervised learning approach. During operation, the deep learning classifier may then identify and classify defects on a bearing under test based on images of this bearing under test.

Additional embodiments of the present disclosure are directed to providing a defect data when one or more defects are identified on a bearing under test. Such defect data may include any type of information associated with the bearing, identified defects, defect classifications, or potential techniques for mitigating defects (e.g., mitigating fabrication of defects). For example, defect data may include an annotated image of the bearing in which locations of identified defects are depicted. As an illustration, arrows or boundaries (e.g., boxes, circles, outlines, or the like) may be provided to indicate the presence of defects. Further, the classes of identified defects (e.g., defect types) may be indicated by text, boundary color, or any other suitable technique. As another example, defect data may include text describing information about identified defects such as, but not limited to, a number of identified defects and their associated classes. As another example, defect data may include text describing root causes associated with particular defects or defect classes. As another example, defect data may include techniques for mitigating fabrication of defects such as, but not limited to, suggested modifications to a fabrication process that are expected to reduce the formation of particular defects or defect types, modifications to the composition of one or more components in the bearing, or modifications to the design of the bearing.

Typical approaches for defect analysis involve manual inspection of bearings or images of bearings, as well as manual generation of a report indicating potential defect classes and the like. It is contemplated that the systems and methods disclosed herein may substantially improve both the speed and reliability of defect detection, as well as the generation of reports associated with the identified defects. For example, the systems and methods disclosed herein may automate the generation of such reports and may further enable the generation of such reports by users that are not necessarily subject matter field experts.

It is further contemplated that the systems and methods may be implemented using a variety of techniques. In some embodiments, a system may include a user device (e.g., a mobile device, a tablet, a personal computer, or the like), which runs an application configured to connect to a server (e.g., a cloud server, a remote server, a local server, or the like). In this configuration, a user may utilize the application on the user device to send images of a bearing under test to the server for analysis and report generation. The user device may then receive a report (if any defects are identified) from the server and display this report on a display. Such a configuration may provide numerous benefits. For example, such a configuration may isolate the source code of a deep learning model used for defect identification and classification from a user operating a user device. In this way, an application suitable for installation on a user device may be widely distributed while preventing disclosure of the deep learning model and associated training data. However, it is to be understood that this is merely an illustration and should not be interpreted as limiting the scope of the present disclosure. In some embodiments, a quantized or reduced footprint of the model can be deployed and run on a user device (e.g., within a mobile app) using the hardware of the user device or other EDGE computing devices. This configuration may be useful in scenarios needing faster response times (e.g., by eliminating time needed to sending images to cloud) and/or scenarios requiring no network dependencies.

Referring now to FIGS. 1A-5F, systems and methods providing image-based detection of defects in mechanical bearings using deep learning techniques are described in greater detail, in accordance with one or more embodiments of the present disclosure.

FIG. 1A illustrates a block diagram of a bearing inspection system 100, in accordance with one or more embodiments of the present disclosure.

In embodiments, a bearing inspection system 100 a includes a camera 102 to capture one or more images of a bearing 104 and various processors 106 configured to execute program instructions stored on at least one memory device 108, where the program instructions cause the processors 106 to identify and/or classify defects on the bearing 104 based on the one or more images. For example, the processors 106 may utilize a deep learning classifier trained to identify a number of defects on the bearing 104 within any of one or more defect classes (e.g., defect types). The processors 106 may further generate a report associated with any identified defects, which may include any type of information associated with the defects such as, but not limited to, a number of defects in one or more defect classes, root causes associated with any of the defects or defect classes, or techniques for mitigating any of the defects or defect classes.

In embodiments, the bearing inspection system 100 includes a user interface 110, which may provide (e.g., display) data to a user and/or may receive input from a user. For example, the user interface 110 may provide an interface for a user to select one or more images of a bearing 104 for analysis. As another example, the user interface 110 may display information to a user such as, but not limited to, a report associated with defect.

The bearing inspection system 100 may be implemented in a variety of architectures within the spirit and scope of the present disclosure.

In some embodiments, the various components of the bearing inspection system 100 (e.g., the various processors 106, the memory device 108, the camera 102, the user interface 110, or the like) are provided as a single device within a common housing. For example, the bearing inspection system 100 may be entirely implemented on a mobile device (e.g., in a common housing) including an integrated camera 102, processors 106, memory devices 108, and user interface 110 (e.g., a touchscreen display).

In some embodiments, the bearing inspection system 100 the various components of the bearing inspection system 100 are provided as separate devices (e.g., in separate housings) that are or may be communicatively coupled. For example, the various components of the bearing inspection system 100 may be distributed between multiple elements such as, but not limited to, mobile devices, personal computers, servers, or a dedicated camera 102. As another example, the bearing inspection system 100 may be implemented on personal computer including processors 106, memory devices 108, and a user interface 110 formed from integrated elements (e.g., an integrated display, an integrated touchscreen, or the like) and/or peripherals (a mouse, a keyboard, an external display, or the like).

The various processors 106 and/or memory devices 108 may also be implemented in a variety of architectures within the spirit and scope of the present disclosure.

The one or more processors 106 processing element known in the art configured to execute algorithms and/or instructions (e.g., program instructions stored in the memory device 108). A processor 106 may include any device having one or more processing or logic elements such as, but not limited to, one or more micro-processor devices, one or more application specific integrated circuit (ASIC) devices, one or more field programmable gate arrays (FPGAs), or one or more digital signal processors (DSPs), one or more central processing units (CPUs), or one or more graphical processing units (GPUs).

A memory device 108 may include any storage medium known in the art suitable for storing program instructions executable by the associated one or more processors 106. For example, the memory device 108 may include a non-transitory memory device. By way of another example, the memory device 108 may include, but is not limited to, a read-only memory (ROM), a random-access memory (RAM), a magnetic or optical memory device (e.g., disk), a magnetic tape, a solid-state drive and the like.

The processors 106 and/or the memory devices 108 may be distributed between any number of housings and/or between any number of devices. For example, embodiments where the bearing inspection system 100 includes multiple devices (e.g., a mobile device and a server), the various devices may have individual sets of processors 106 and/or memory devices 108. In this way, the processors 106 on each device may implement various program instructions stored on one or more memory devices 108 that may be local to the device and/or in a different device. For instance, a processor 106 may access a remote memory device 108 that is accessible through a communication channel (e.g., internet, intranet, a mobile network, or the like).

The various processors 106 and/or memory devices 108 of the bearing inspection system 100 may be configured to implement tasks (e.g., process steps or actions described throughout the present disclosure), either directly or indirectly. For example, one or more processors 106 may be configured to execute program instructions stored on a memory device 108 that cause the one or more processors 106 to directly implement tasks such as, but not limited to, receiving data or applying processing steps to extract information of interest from the data. As another example, one or more processors 106 may be configured to execute program instructions stored on a memory device 108 that cause the one or more processors 106 to indirectly implement tasks by generating and transmitting control signals to other components of the bearing inspection system 100 that direct the other components to perform various tasks.

Further, any given task may be implemented by one or more processors 106 within a common device or distributed between different devices of the bearing inspection system 100 using any processing architecture or strategy such as, but not limited to, single-threaded processing, multi-threaded processing, parallel processing, or distributed processing.

Figure 1B:
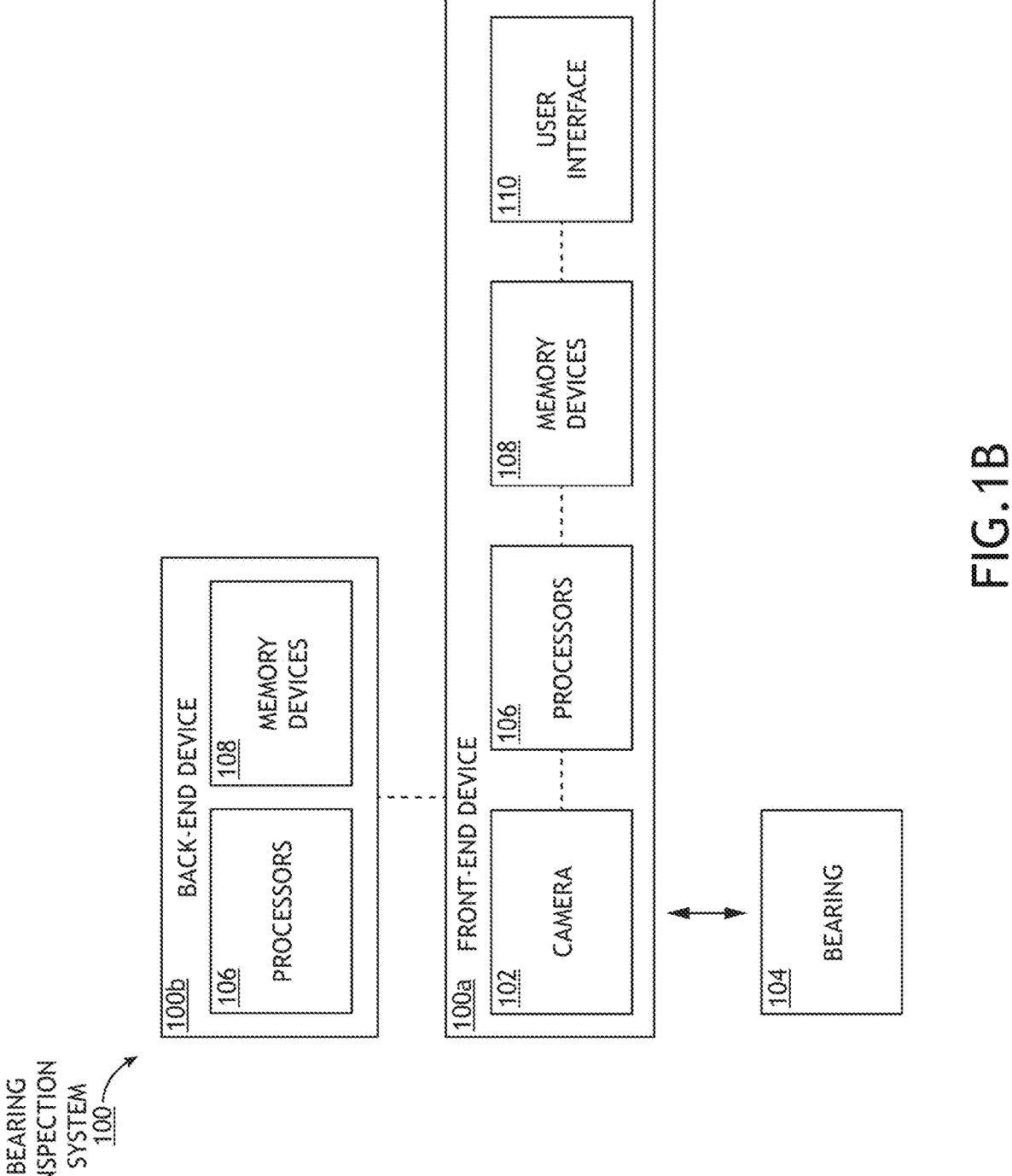
FIG. 1B illustrates a block diagram view illustration a bearing inspection system configured with a front-end device that is directly accessible to a user and a back-end device in communication with the front-end device, in accordance with one or more embodiments of the present disclosure.

FIG. 1B illustrates a block diagram view illustration a bearing inspection system 100 configured with a front-end device 100a that is directly accessible to a user and a back-end device 100b in communication with the front-end device 100a, in accordance with one or more embodiments of the present disclosure. In the configuration of FIG. 1B, the user may interact with the front-end device 100a, where the front-end device 100a and the back-end device 100b are in communication for the transfer of data and/or instructions as needed. Further, FIG. 1B depicts a configuration in which the front-end device 100a and the back-end device 100b have individual sets of one or more processors 106 and/or memory devices 108. As described previously herein, the processors 106 of the front-end device 100a and the back-end device 100b may be communicatively coupled to provide for the transfer of data or instructions. In this way, the processors 106 of the front-end device 100a and/or the back-end device 100b may carry out a task individually and/or engage in parallel or distributed processing for joint completion of a task.

The front-end device 100a and the back-end device 100b may be provided as any type of devices suitable for an application of interest. For example, the back-end device 100b may be configured as a server (e.g., a local server, a remote server, a cloud server, or the like) accessible to the front-end device 100a, while the front-end device 100a may include a user interface 110 and/or a camera 102 as integrated and/or external components. As an illustration, the front-end device 100a may be provided as a mobile device that may include a user interface 110 formed as a touch-screen, an integrated camera 102, and integrated processors 106 and/or memory devices 108. As another illustration, the front-end device 100a may be provided as a personal computer with either an integrated or external user interface 110.

Further, although FIG. 1B depicts a configuration with a single back-end device 100b and a single front-end device 100a, the bearing inspection system 100 may include any number of front-end devices 100a or back-end devices 100b. As an illustration, various program instructions suitable for operation on a front-end device 100a may be distributed as an application for installation and operation on multiple front-end devices 100a. As another illustration, a back-end device 100b configured as a server may incorporate multiple connected server devices either in a local environment or in a cloud environment.

The configuration of FIG. 1B may be utilized in numerous ways within the spirit and scope of the present disclosure.

In some embodiments, a user may use the front-end device 100a to select one or more images of a bearing 104 for defect analysis. The front-end device 100a may then transmit the images to the back-end device 100b, where the back-end device 100b may implement a deep learning classifier to identify and/or classify defects on the bearing 104 based on the images. The back-end device 100b may then transmit defect data associated with an output of the deep learning classifier (e.g., a number of defects of different classes). In this arrangement, the images may be captured with a camera 102 integrated into and/or connected to the front-end device 100a, may be stored on a memory device 108 of the front-end device 100a, and/or may be stored on another device (e.g., a cloud storage device) and accessed by the front-end device 100a.

This arrangement may have various benefits. Notably, this arrangement may isolate the back-end device 100b from the user such that the user may not have direct physical or programmatic access to contents or instructions stored on the back-end device 100b. As an illustration, it may be desirable to store and implement a deep learning classifier for identifying defects on a bearing 104 as well as training data for the deep learning classifier on the back-end device 100b. This arrangement may allow the user to gain the benefit of the deep learning classifier (e.g., obtain classifications of defects on a bearing 104 based on user-supplied images of the bearing 104) without exposing the source code of the deep learning classifier or the underlying training data to the user. As another illustration, the back-end device 100b may expose one or more secured-access APIs (application programming interfaces) such that various front-end devices 100a may utilize the APIS to obtain prediction results from the back-end device 100b. For instance, an application may be broadly distributed to multiple front-end devices 100a (e.g., via a publicly available application store) in a manner that allows many users (potentially in different organizations) to utilize the back-end device 100b (and become a part of the bearing inspection system 100 as a whole) but prevents users from gaining access to the underlying deep learning classifier and/or underlying training data.

This arrangement may also simplify training and/or updating of the deep learning classifier since both the storage and operation of the deep learning classifier occurs on the back-end device 100b. This arrangement may also beneficially distribute computing resources in an efficient manner. For example, the training and/or implementation of a deep learning classifier may be a relatively computationally-intensive task. As a result, the back-end device 100b may include a number and/or type of hardware devices designed to efficiently perform the tasks of training and/or implementation of a deep learning classifier.

However, it is to be understood FIG. 1B and the associated description is provided solely for illustrative purposes and should not be interpreted as limiting the scope of the present disclosure. For example, a deep learning classifier may be implemented at least in part on a front-end device 100a or any other component of the bearing inspection system 100.

In some embodiments, a quantized or reduced footprint of the model can be deployed and run on a front-end device 100a (e.g., within a mobile app) using the hardware of the front-end device 100a or other EDGE computing devices. This configuration may be useful in scenarios needing faster response times (e.g., by eliminating time needed to sending images to cloud) and/or scenarios requiring no network dependencies.

Referring now to FIGS. 2-5F, the use of a deep learning classifier to identify and/or classify defects on a bearing 104 based on one or more images of the bearing 104 is described in greater detail, in accordance with one or more embodiments of the present disclosure.

The deep learning classifier may implement any type or combination of types of learning to provide defect identification and/or classification including, but not limited to, supervised learning, semi-supervised learning, unsupervised learning, or reinforcement learning. The deep learning classifier may further identify and/or classify defects using any type of deep learning technique or combination of techniques known in the art such as, but not limited to, a You Only Look Once (YOLO) classifier, a region-based convolutional neural network (R-CNN), a Fast R-CNN, a Faster R-CNN, a support vector machine classifier, a nearest neighbor classifier, a perceptron, a logistic regression classifier, a vision transformer, a multi-modal models (e.g., LLaVa, GPT-4 Vision, or the like), or a simpler Bayes classifier. Deep learning models can be fine-tuned or trained with defective bearing images as a classifier model or an object detection model or a segmentation model and respective base trained frameworks are chosen accordingly.

The deep learning classifier may classify defects into any number of defect classifications. In some embodiments, the deep learning classifier provides a binary classification of an analyzed area into two defect classes: defect or no defect (e.g., non-defect). In some embodiments, the deep learning classifier provides classification of an analyzed area into two or more classes. Non-limiting examples of defect classifications may include, but are not limited to, cracking, discoloration, false brinelling, fretting, indentation, pitting, rust, spalling, or an overheating defect. Further, multi-label classification schemes may include a class associated with no defect.

In some cases, a multi-class classification scheme may include a class associated with defects of unknown type. For instance, the deep learning classifier may identify an area as a potential defect but may assign similar probabilities of the area to two or more different defect classes (potentially including a non-defect class). In this case, the deep learning classifier may have a low confidence associated with the type of defect that has been identified and thus assign it into a class associated with defects of unknown type.

Additionally, the deep learning classifier may implement both binary and multi-class classification techniques. For example, a binary classification technique may be used to provide a relative confidence of whether a particular area of interest is a defect of any type, and a multi-class classification technique may provide a prediction of the defect type. It is contemplated herein that the combination of information associated with confidence of defect status overall and a prediction of the defect class may provide additional value beyond either classification technique alone. As an illustration, a user may place relatively lower value on a potential defect in one or more classes (e.g., as determined from a multi-class classification technique) associated with a relatively low confidence using a binary classification technique compared to a potential defect associated with a relatively high confidence using a binary classification technique.

The deep learning classifier may be trained using training data from any suitable source such as, but not limited to, images of bearings 104 with either known or unknown defect types.

For example, supervised learning may be implemented using images of bearings with no defects as well as defects of known classes (e.g., labels associated with defects of different classes). In this way, the deep learning model may generate correlations suitable for classifying new images of a bearing 104 into one of the labeled defect classes.

As another example, unsupervised learning may be implemented using images of bearings 104 with both no defects and images of bearings 104 with known or potential defects with unknown type (or where information associated with known or suspected defect type is not considered). In this way, the deep learning model may identify any number of different types of defects based on analysis of the images and generate correlations suitable for classifying new images of a bearing 104 into one of the identified defect classes.

Figure 2:
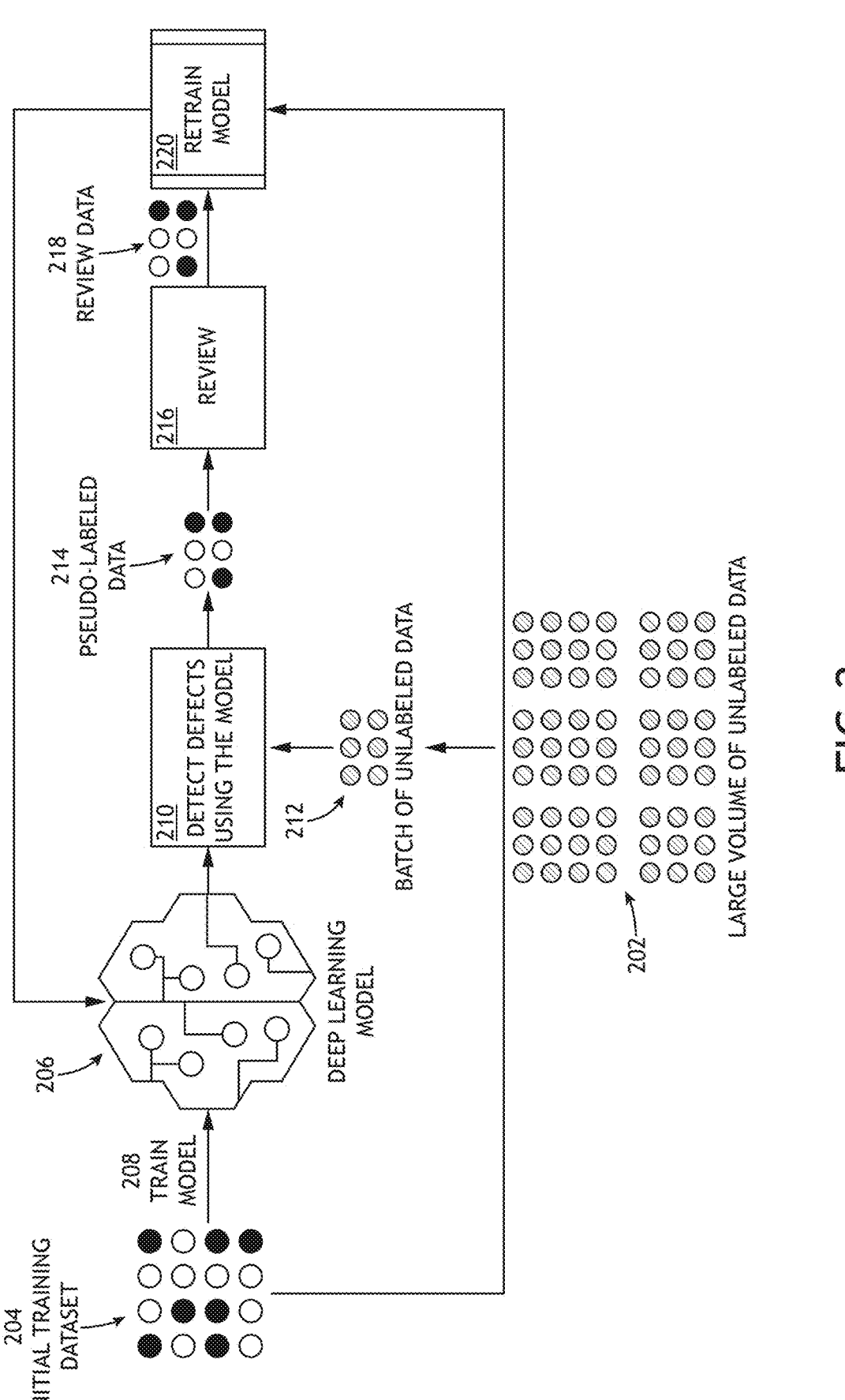
FIG. 2 illustrates a block diagram depicting a semi-supervised learning technique based on iterative retraining of a model with user-added labels, in accordance with one or more embodiments of the present disclosure.

As another example, semi-supervised learning may incorporate aspects of both supervised and unsupervised learning using any suitable technique. FIG. 2 illustrates a block diagram depicting a semi-supervised learning technique, in accordance with one or more embodiments of the present disclosure.

Semi-supervised learning provides an iterative approach in which a deep learning model may be trained with a relatively small amount of initial training data and iteratively trained through user interaction (e.g., generated and/or verified by subject matter experts). Supervised learning approaches tend to outperform unsupervised and other approaches. However, supervised learning approaches require a large volume of high-quality labelled data for training, which is impractical in many real-world situations. For example, a potential training dataset may be associated with a potentially large volume of unlabeled data 202 from customer-uploaded images, images extracted from open-source datasets, or from any number of sources. However, it is impractical in many applications to have subject matter experts review and label all potential training data (e.g., unlabeled data 202 or the like).

In some embodiments, a semi-supervised learning technique includes obtaining an initial training dataset 204, where the initial training dataset 204 is trusted. For example, the initial training dataset 204 may include images of known defects. The initial training dataset 204 may be generated using any suitable technique. In some cases, the initial training dataset 204 is generated and/or verified by a subject matter expert. For instance, a subject matter expert may analyze and label a subset of available unlabeled data 202. In some cases, the initial training dataset 204 is a golden dataset coming from defect masters catalogued as reference.

A deep learning model 206 may then be trained (e.g., step 208) with this initial training dataset 204. Once trained, the deep learning model 206 may be applied (e.g., step 210) to detect defects based on a batch of unlabeled data 212. Put another way, the step 210 may correspond to running inferences with the deep learning model 206 to detect defects based on a batch of unlabeled data 212. In this configuration, the outputs of the deep learning model 206 may correspond to pseudo-labeled data 214. A subset of high confidence of pseudo-labeled data 214 data was chosen for iteratively improving the base deep learning model.

In some embodiments, at least a portion of the pseudo-labeled data 214 is reviewed (e.g., step 216) to generate reviewed data 218. For example, a subject matter expert may review at least a portion of the pseudo-labeled data 214 and make corrections as needed. The deep learning model 206 may then be retrained (e.g., step 220) based on the reviewed data 218 in addition to the initial training dataset 204. As an illustration, at least a portion of high-confidence predictions generated by the deep learning model 206 may be reviewed (step 216), where high-confidence predictions correspond to predictions of defects identified with at least a selected threshold confidence level (e.g., 80% or any selected confidence level).

This process may be repeated (e.g., step 222) any number of times and at any frequency to progressively train (e.g., step 208) the deep learning model 206. For example, the deep learning model 206 may be retrained (e.g., step 208) after every batch or every few batches of unlabeled data 212. In some cases, the process is repeated until the large volume of unlabeled data 202 is fully processed and labelled It is contemplated herein that such a semi-supervised learning technique may balance the need for high volumes of accurate (e.g., high-quality) training data with the time required to generate such training data. In particular, it may be relatively faster to have subject matter experts first generate a small amount of high-quality initial training data 204 and then periodically review high-confidence pseudo-labeled data 214 than to generate a large amount of high-quality initial training data from a large volume of available unlabeled data 202. Further, the batch size of unlabeled data 212 fed to the deep learning model 206 may increase over time (e.g., with increasing numbers of iterations of supervised learning) as the accuracy of the deep learning model 206 increases.

In some embodiments, the supervised learning process depicted in FIG. 2 may be extended to train the deep learning model 206 on noisy data (e.g., data with natural variations and/or noise). For example, a first portion of the unlabeled data 202 may correspond to defect masters and may have known defects, even if the particular images are not fully labeled. A second portion of the unlabeled data 202 may then be relatively more noisy. In this configuration, the deep learning model 206 may be initially trained with the first portion of the unlabeled data 202 (or a portion thereof) to quickly develop accurate performance for common cases and then trained with increasing amounts of the noisy second portion of the unlabeled data 202 to improve the robustness and/or prediction accuracy of the deep learning model 206.

A training dataset may preferably include a balanced number of images associated with each defect class of interest. Put another way, it may be beneficial to provide a training dataset composed of equal (or substantially equal) numbers of images associated with each defect class. Such a balanced training dataset may facilitate accurate prediction by the model of defects into all of the defect classes. In contrast, an imbalanced training dataset in which one or more defect classes have substantially fewer images than other defect classes may result in prediction inaccuracies.

However, it may be the case that an available training dataset is imbalanced. For example, this may occur when certain defect types occur more often than others and/or when certain defect types are easier to identify (e.g., by a user) than others.

Figure 3A:
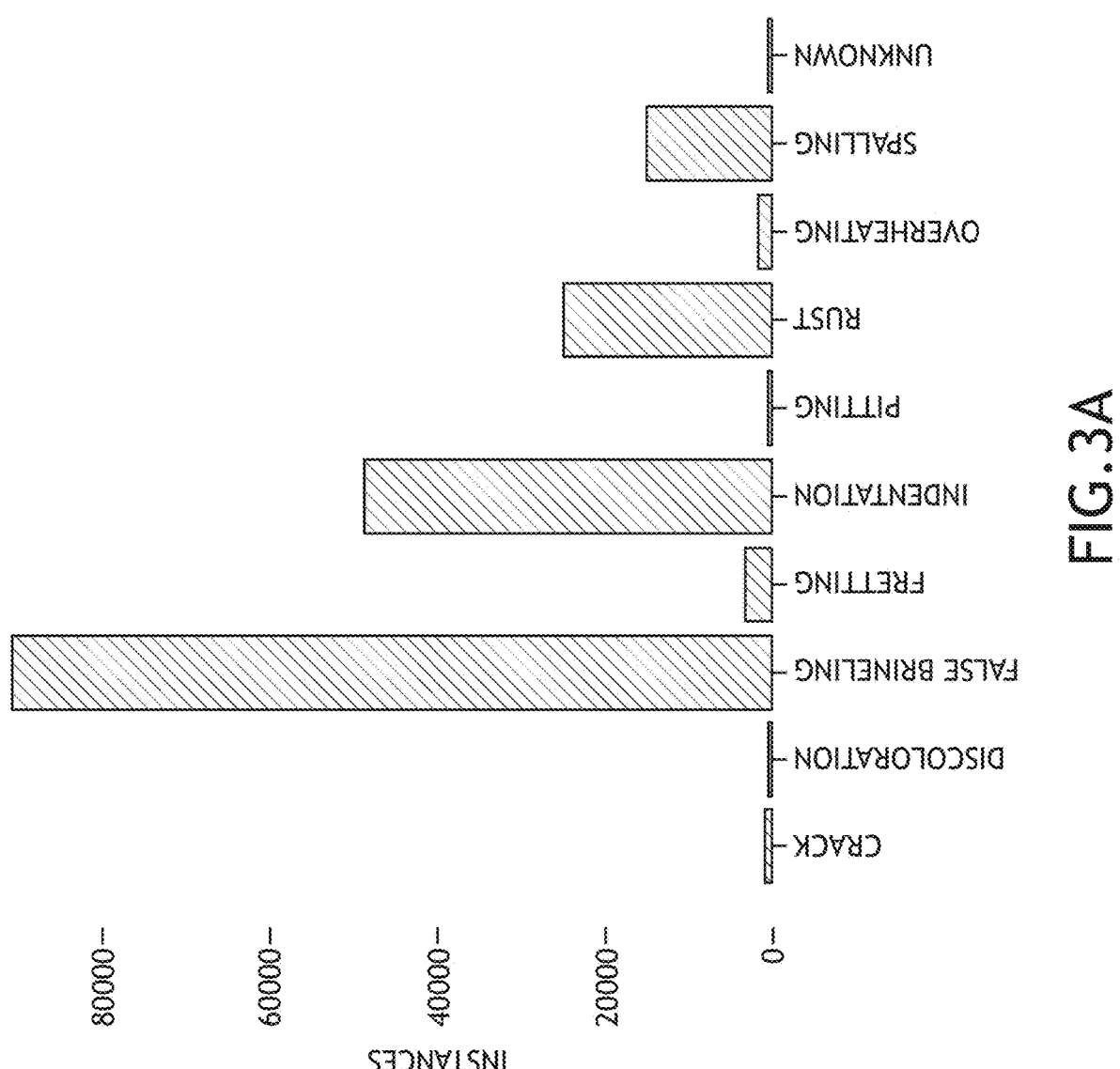
FIG. 3A illustrates a bar plot depicting the instances of selected defect types present in a training dataset derived from defect reports associated with user-identified defects, in accordance with one or more embodiments of the present disclosure.

FIG. 3A illustrates a bar plot depicting the instances of selected defect types (e.g., defect classes) present in a training dataset derived from defect reports associated with user-identified defects, in accordance with one or more embodiments of the present disclosure. As seen in FIG. 3A, the number of instances of the various defect types in the training dataset varies substantially. In particular, four of the defect classes have several orders have several orders of magnitude more instances than the remaining defect types. Such an imbalanced dataset may be the result of multiple factors including, but not limited to, naturally-occurring differences in the relative occurrences of the different defect types or over sampling of defect types that are relatively easier to identify.

In embodiments, the bearing inspection system 100 (e.g., via program instructions executed by one or more processors 106) balances a training dataset. This may be implemented either prior to an initial training of a deep learning classifier, iteratively using semi-supervised learning techniques, or at any desired time or interval.

The bearing inspection system 100 may balance a training dataset using any suitable technique.

For example, the bearing inspection system 100 may balance a training dataset by undersampling portions of the training dataset associated with overrepresented defect classes (e.g., false brinelling, indendation, rust, and/or spalling the dataset represented in FIG. 3A). In this way, portions of the training dataset associated with overrepresented defect classes may be intentionally discarded to at least partially balance the training dataset. It is contemplated herein that undersampling may be well suited for cases in which the remaining defect classes (e.g., the underrepresented defect classes) are sufficiently sampled. However, in cases where remaining defect classes (e.g., the underrepresented defect classes) undersampling may degrade the overall accuracy and/or robustness of the model.

As another example, the bearing inspection system 100 may balance a training dataset using additional training data associated with underrepresented defect classes, where the additional training data may be generated by any suitable technique. For instance, additional training data may be generated synthetically based on simulations, generative deep learning techniques, competitive deep learning techniques, applying image augmentation techniques or any other suitable technique. In another instance, additional training data may be provided by a user (e.g., in response to a prompt by the bearing inspection system 100). In this way, a user may intentionally find or create images of bearings 104 with defects in underrepresented classes to supplement the training dataset.

As another example, the bearing inspection system 100 may balance a training dataset using a semi-supervised learning technique such as, but not limited to, that depicted in FIG. 2. For example, the labeled images provided in box 208 and added to the training dataset may be preferentially or exclusively associated with underrepresented defect classes.

Figure 3B:
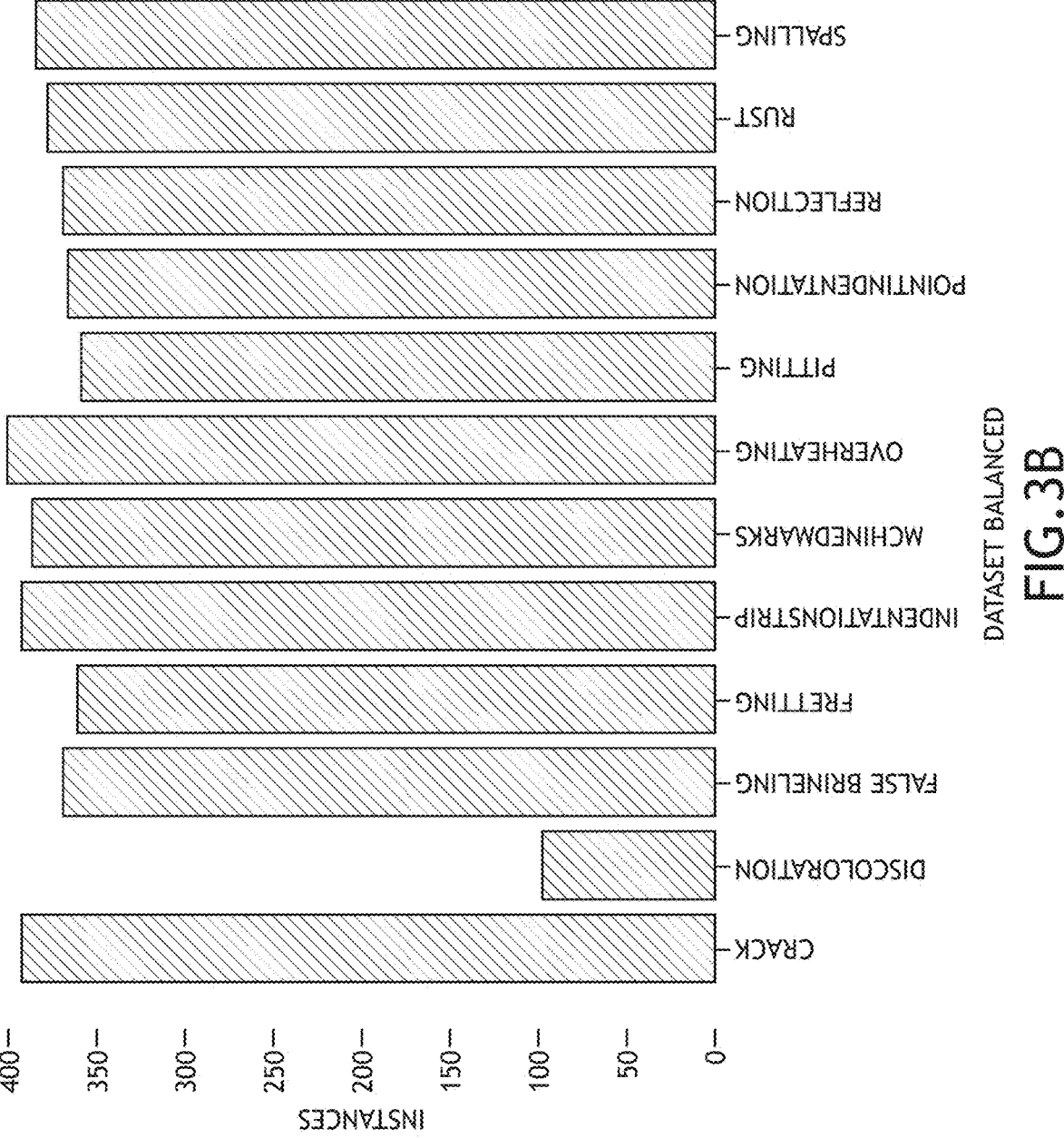
FIG. 3B illustrates a bar plot depicting the instances of selected defect types (e.g., defect classes) present in a balanced training dataset, in accordance with one or more embodiments of the present disclosure.

FIG. 3B illustrates a bar plot depicting the instances of selected defect types (e.g., defect classes) present in a balanced training dataset, in accordance with one or more embodiments of the present disclosure. In particular, the initial training dataset depicted in FIG. 3A includes approximately 2,500 labeled images. FIG. 3B provides a snapshot after 10 iterations of running a semi-supervised learning approach and augmenting the classes after each iteration. It is noted that the magnitude difference between FIGS. 3A and 3B are related to the sampling size at a particular step, where FIG. 3B illustrates how balancing may occur at any (or each) iteration of semi-supervised learning. As shown in FIG. 3B, the result is a substantially more balanced dataset where the deviation in the number of instances of all but one of the defect classes is relatively small. It is expected that additional iterations of the semi-supervised learning depicted in FIG. 2 and/or other balancing techniques could further balance the training dataset.

Referring now to FIG. 4, FIG. 4 illustrates a flow diagram illustrating steps performed in a method 400 for identifying defects on a bearing using a deep learning classifier, in accordance with one or more embodiments of the present disclosure. The embodiments and enabling technologies described previously herein in the context of the bearing inspection system 100 should be interpreted to extend to the method 400. For example, the one or more processors 106 of the method 400 may be configured to execute program instructions stored on one or more memory devices 108, where the program instructions cause the one or more processors 106 to implement the steps of the method 400 either directly or indirectly. Further, various descriptions of the method 400 below refer to aspects of the bearing inspection system 100. However, this is merely for illustrative purposes and should not be interpreted as limiting the scope of the present disclosure. The method 400 is not limited to the architecture of the bearing inspection system 100.

The method 400 may include a step 402 of receiving one or more images of a bearing 104 from a user via a user interface 110. As an example, in the context of the bearing inspection system 100 depicted in FIG. 1B, the step 402 may be implemented on a front-end device 100a such as, but not limited to, a mobile device. Further, the images may be directly captured by the front-end device 100a, may be stored on a memory device 108 of the front-end device 100a, and/or may be stored on an additional device (e.g., a server) and accessed by the front-end device 100a.

The method 400 may include a step 404 of identifying a number of defects of one or more defect classes on a bearing 104 based on one or more test images using a deep learning classifier (e.g., a deep learning classifier trained as disclosed herein). The deep learning classifier may include a binary classifier, a multi-class classifier, or a combination thereof. Further, the deep learning classifier may incorporate any model or combination of models such as, but not limited to, a YOLO classifier, an R-CNN, a Fast R-CNN, a Faster R-CNN, a support vector machine classifier, a nearest neighbor classifier, a perceptron, a logistic regression classifier, or a Bayes classifier.

The method 400 may include a step 406 of generating defect data associated with the defects identified on the bearing 104 when the number of defects identified on the bearing is at least one.

The defect data may include any type of data indicative of defects on a bearing 104 identified and/or classified by the deep learning classifier. For example, the defect data may include a total number of identified defects. As another example, the defect data may include classifications of any of the identified defects. As another example, the defect data may include probability data associated with assigning defect classes to identified defects. As an illustration, a deep learning model may assign probability that any particular area of interest belongs to each of the available defect classes. These probabilities may then be used to assign defect classes to areas of interest. For instance, each area of interest may be assigned to the defect class associated with the highest probability. In another instance, each area of interest may be assigned to a defect class based on a multi-factor analysis of the various probabilities. However, in some cases, it may be desirable to present, as defect data, the various probabilities that an area of interest falls within each of the defect classes. In this way, a user may make additional judgements and/or take action based on this information.

As another example, the defect data may include an annotated image of the bearing 104 in which information of an identified defect is shown. For instance, an annotated image may include markings indicative of a location of an identified defect. Any type of markings may be used such as, but not limited to, an arrow, a bounding box, a circle, or an outline of an identified defect.

Figure 5A:
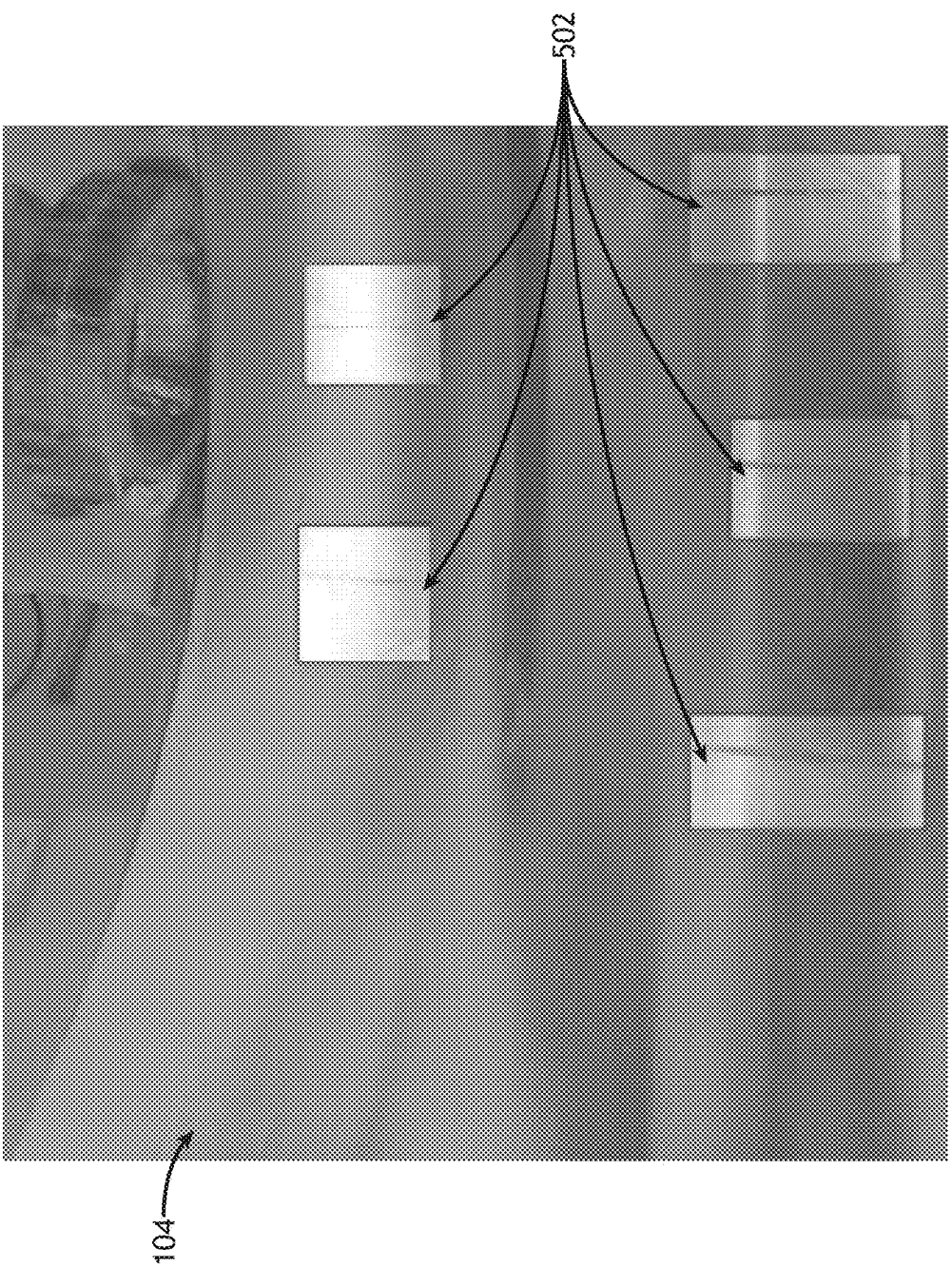
FIG. 5A illustrates a first annotated image of a bearing depicting an identified false brinelling defect indicated by bounding boxes, in accordance with one or more embodiments of the present disclosure.
Figure 5B:
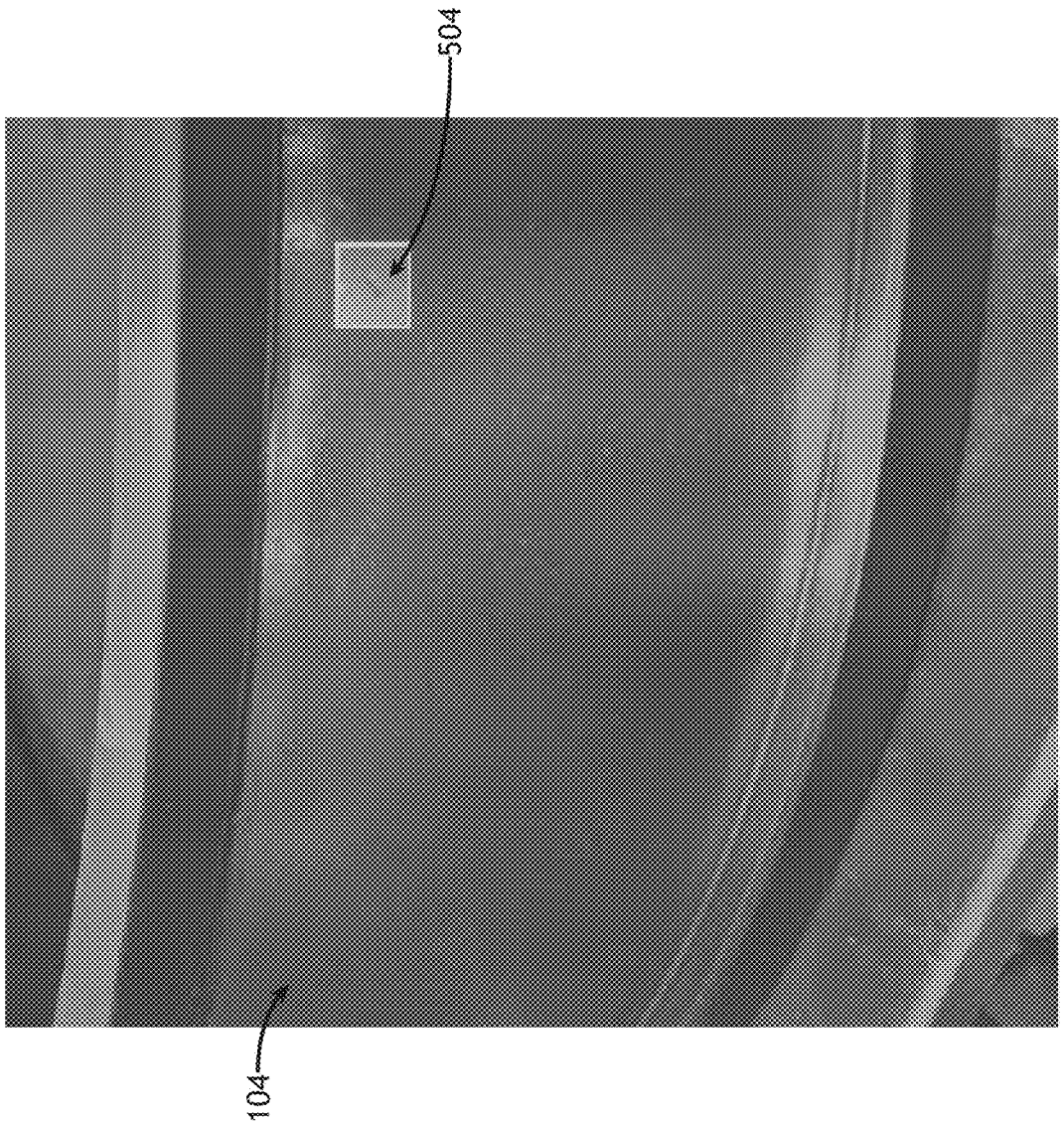
FIG. 5B illustrates a second annotated image of a bearing depicting indentation/pitting defects indicated by a bounding box, in accordance with one or more embodiments of the present disclosure.
Figure 5C:
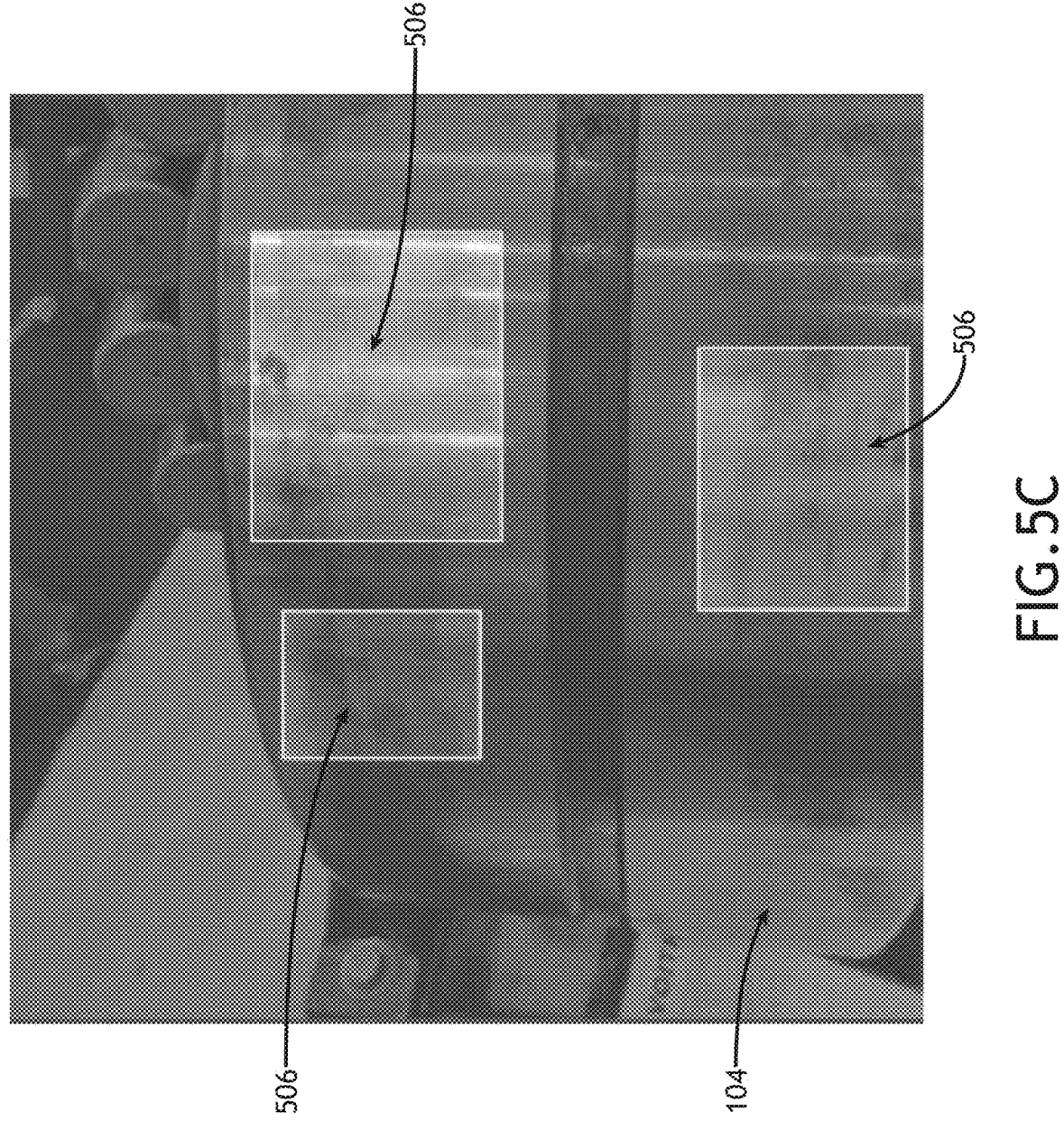
FIG. 5C illustrates an annotated image of a bearing depicting identified corrosion defects indicated by bounding boxes, in accordance with one or more embodiments of the present disclosure.
Figure 5D:
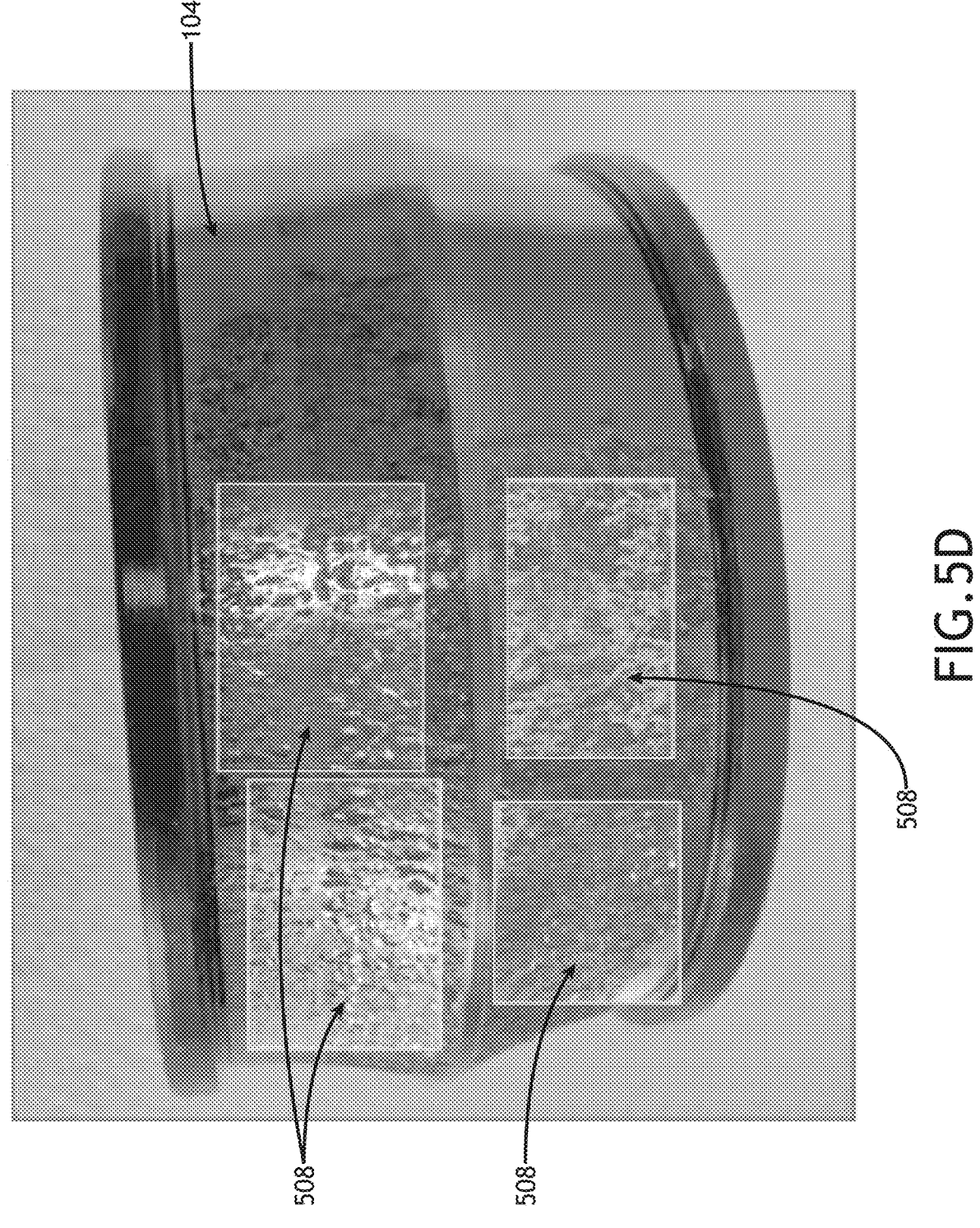
FIG. 5D illustrates an annotated image of a bearing depicting identified spalling defects indicated by bounding boxes, in accordance with one or more embodiments of the present disclosure.
Figure 5E:
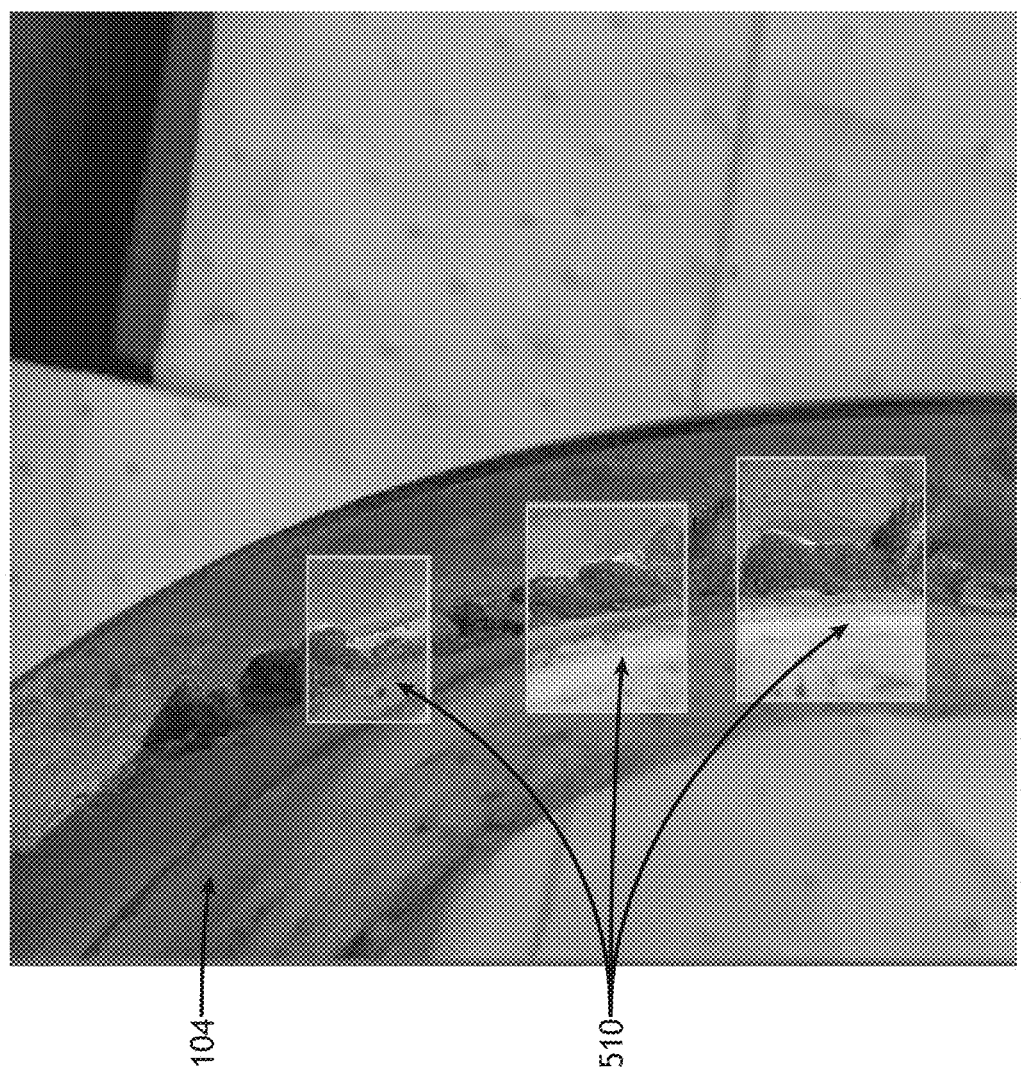
FIG. 5E illustrates an annotated image of a bearing depicting identified spalling defects indicated by bounding boxes, in accordance with one or more embodiments of the present disclosure.
Figure 5F:
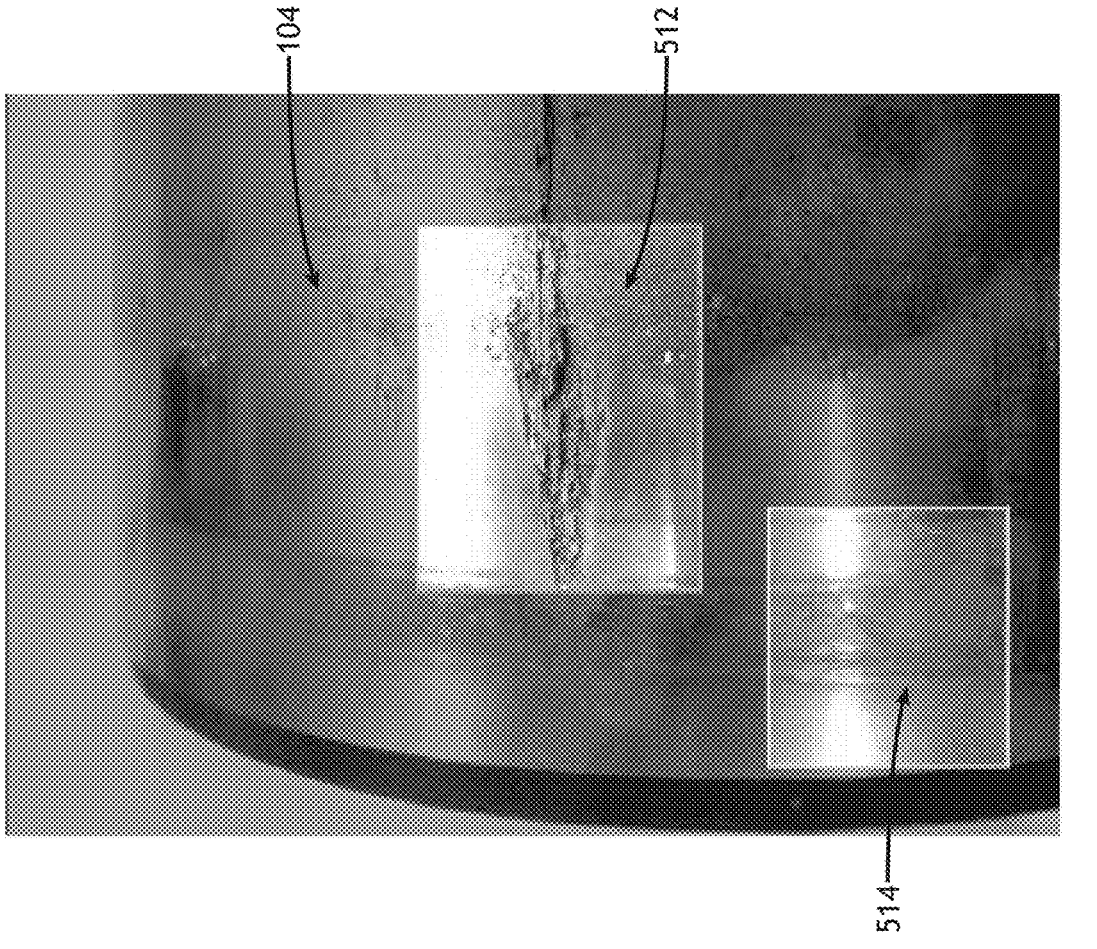
FIG. 5F illustrates an annotated image of a bearing depicting an identified spalling defect indicated by a bounding box and an identified corrosion defect indicated by a bounding box, in accordance with one or more embodiments of the present disclosure.

FIGS. 5A-5F depict annotated images depicting locations of defects identified based on the method 400, in accordance with one or more embodiments of the present disclosure. FIG. 5A illustrates a first annotated image of a bearing 104 depicting an identified false brinelling defect indicated by bounding boxes 502, in accordance with one or more embodiments of the present disclosure. FIG. 5B illustrates a second annotated image of a bearing 104 depicting indentation/pitting defects indicated by a bounding box 504, in accordance with one or more embodiments of the present disclosure. FIG. 5C illustrates an annotated image of a bearing 104 depicting identified corrosion defects indicated by a bounding boxes 506, in accordance with one or more embodiments of the present disclosure. FIG. 5D illustrates an annotated image of a bearing 104 depicting identified spalling defects indicated by bounding boxes 508, in accordance with one or more embodiments of the present disclosure. FIG. 5E illustrates an annotated image of a bearing 104 depicting identified spalling defects indicated by bounding boxes 510, in accordance with one or more embodiments of the present disclosure. FIG. 5F illustrates an annotated image of a bearing 104 depicting an identified spalling defect indicated by a bounding box 512 and an identified corrosion defect indicated by a bounding box 514, in accordance with one or more embodiments of the present disclosure.

As another example, the defect data may include information about known or expected root causes associated with any of the identified defects or defect classes. The root cause information may be derived from any source. For instance, root cause information associated with each of the identified defect classes may be stored on a memory device 108. In this case, when at least one defect of a particular defect class is identified, the stored root cause information about the particular defect class may be provided as defect data. In another instance, root cause information may be generated at least in part from the number, type, and/or locations of identified defects. It may be the case that certain defect types may commonly lead to additional defect types such that the presence and/or locations of both defect types may indicate or suggest a link to a common root cause. As an illustration, a local spalling defect (e.g., one defect type) may be commonly generated at a location associated with an indentation defect (e.g., another defect type). As a result, the identification of a local spalling defect and an indentation defect in a common location may suggest a common root cause for both defects. It is to be understood that this is merely an illustration and should not be interpreted as limiting the scope of the present disclosure. More broadly, a root cause may be identified by any combination of any number of properties of one or more defects such as, but not limited to, location (e.g., location on a bearing 104), size, proximity, number, or groupings. Further, root causes may be provided by a knowledge base generated based on previous data and industry knowledge.

In some cases, root causes are linked to a standard that may define and/or categorize various defect types and/or root causes. For example, defect data including root cause information may be associated with failure modes defined in International Organization for Standardization (ISO) standard 15243:2017, which is incorporated herein by reference in its entirety. As an illustration, ISO standard 15243:2017 defines multiple failure modes such as rolling contact fatigue (e.g., surface initiated fatigue, sub-surface initiated fatigue, or the like), wear (e.g., abrasive wear, adhesive wear, or the like), corrosion (e.g., moisture corrosion, frictional corrosion, or the like), electrical erosion (e.g., excessive current erosion, current leakage corrosion, or the like), plastic deformation (e.g., overload deformation, indentation from particles, or the like), or cracking/fracture (e.g., forced fracture, fatigue fracture, thermal cracking, or the like). Further, any particular failure mode may induce one or more defect types (e.g., associated with one or more defect classes).

As another example, defect data may include defect mitigation techniques associated with any of the identified defects and/or defect classes. For instance, a defect mitigation technique may include suggestions such as, but not limited to, a modification to a bearing 104 manufacturing process, a modification of a material composition within a bearing 104, or a modification of a bearing 104 design.

The method 400 may include a step 408 of causing the defect data to be displayed on a display device (e.g., a component of a user interface 110). In this way, the defect data may be provided to a user.

The various defect data generated in step 406 and displayed in may be formatted in any suitable manner. For example, the defect data may be formatted in the form of a report, which may provide a standardized layout of various pieces of defect data. As another example, the defect data may be presented in an interactive format in which a user may selectively engage with defect data associated with different identified defects. For instance, the defect data may be display in a way that a user may select an identified defect in an annotated image, which may then cause the display of additional defect data associated with the selected defect such as, but not limited to, defect class, root cause information, or defect mitigation information.

Referring again to FIG. 4, additional steps of the method 400 are described.

In some applications it may be desirable to ensure that images used for defect identification and/or classification (e.g., images provided as inputs to a deep learning classifier) meet one or more quality standards. In this way, images that do not meet the quality standards may be discarded (e.g., not provided as inputs to a deep learning classifier).

The method 400 may include a step 410 of verifying whether the one or more images meet one or more quality standards. The method 400 may include a step 412 of discarding any of the one or more images that fail at least one of the one or more quality standards, where a set of one or more test images includes any of the one or more images that pass the one or more quality standards. In this case, the steps 404-408 may be modified to be applied to the potentially smaller set of test images rather than all images received in step 402.

A quality standard may include any type of metric for characterizing an image. Further, a quality standard may be characterized by a metric that may be represented as a numerical value. In this way, whether a particular image passes or fails the quality standard may be determined based on a thresholding technique (e.g., images having values of the metric above the threshold pass while others fail) or any other suitable technique.

For example, a quality standard may include an image quality standard. In this case, one or more metrics may be defined to characterize aspects of image quality such as, but not limited to, contrast or blur (e.g., a measure of whether the image is in focus).

As another example, a quality standard may include an object detection check. As an illustration, a quality standard may include a check to determine whether a bearing 104 or a portion thereof, is present in an image. An image may pass such as quality standard if a bearing 104 or a portion thereof, is present and fail otherwise. As another illustration, a quality standard may include a check to determine whether a face (e.g., a human face), or a portion thereof, is present in an image. An image may fail such as quality standard if a face or a portion thereof, is present and pass otherwise.

The step 410 of verifying whether the one or more images meet one or more quality standards may be performed using any technique known in the art. Further different quality standards may be verified using potentially different techniques. In some cases, a quality standard is verified based on a deterministic image analysis. For example, many image quality standards may be determined based on a deterministic image analysis technique. In some cases, a quality standard is verified based on a deep learning technique. For example, quality standards based on object detection may be determined using a deep learning technique. In this case, any type of deep learning technique may be utilized including, but not limited to, a deep learning classifier as disclosed herein.

In some applications, the method 400 may include a step 414 of authenticating a user. A user may be authenticated using any suitable technique such as, but not limited to, a password, or an access delegation protocol (e.g., OAuth2.0, or the like). Further the step 410 may be used for authentication into any device or combination of devices. For example, in a configuration in which the various components of the bearing inspection system 100 are provided in a single device, user authentication may allow a user access to the device itself and/or an application within the device providing program instructions configured to implement the method 400 in whole or in part. As another example, in a configuration in which various components of the bearing inspection system 100 are separated but communicatively coupled as depicted in FIG. 1B, user authentication may allow a user access to the front-end device 100a itself, access for the front-end device 100a to communicate with the back-end device 100b, access to the back-end device 100b (e.g., if the user has suitable privileges), and/or an application within the front-end device 100a providing program instructions configured to implement the method 400 in whole or in part.

Referring generally to FIG. 4, the method 400 may be implemented in whole or in part by any combination of processors 106 in any device within the bearing inspection system 100. For example, in a configuration in which the various components of the bearing inspection system 100 are provided in a single device, any or all of the steps of the method 400 may be implemented by processors 106 of the device through the execution of program instructions stored on one or more memory devices 108 either local to the device (e.g., associated with an application on the device) or on a different device.

As another example, in a configuration in which various components of the bearing inspection system 100 are separated but communicatively coupled as depicted in FIG. 1B, different steps of the method 400 may be implemented by processors 106 on the different devices through the execution of program instructions stored on one or more memory devices 108 either local to the devices or on different devices. As an illustration based on the configuration depicted in FIG. 1B, the front-end device 100a may perform the step 402 of receiving one or more images of a bearing 104 from a user via a user interface 110 through direct capture of the images using a camera 102 or by accessing one or more images stored on a memory device 108 of the front-end device 100a or a different device (e.g., a local or remote server). The front-end device 100a may then transmit the one or more images to the back-end device 100b, where the back-end device 100b may perform any combination of the steps 404-406 of identifying defects based on one or more images received from the front-end device 100a and generating defect data. Further, in the case where quality checks are desired, the back-end device 100b may perform steps 410-412 of verifying whether the images meet the quality standards and discarding images that do not meet the quality standards. As described previously herein, the steps 404-406 may then be performed on only those images that meet the quality standards (e.g., a set of test images). Finally, the front-end device 100a may receive the defect data from the back-end device 100b and may perform the step 408 of causing the defect data to be displayed on a display device (e.g., a component of a user interface 110 of the front-end device 100a). Again, it is to be understood that the configuration in FIG. 1B and any descriptions associated with FIG. 1B are provided solely for illustrative purposes and should not be interpreted as limiting the present disclosure. Rather, the bearing inspection system 100 may have any configuration, where any steps of the method 400 may be implemented on any combination of devices.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

LIST OF REFERENCE NUMBERS

100 bearing inspection system
100a front-end device
100b back-end device
102 camera
104 bearing
106 processors
108 memory device
110 user interface
202 unlabeled data
204 initial training dataset
206 deep learning model
208 step
210 step
212 batch of unlabeled data
214 pseudo-labeled data
216 step
218 reviewed data
220 step
222 step
400 method
502 bounding box
504 bounding boxes
506 bounding box
508 bounding box
510 bounding box
512 bounding box

What is claimed:

1. A system for defect inspection comprising:
   a back-end device including a server with one or more processors configured to execute program instructions stored in a non-transitory memory device, wherein the program instructions are configured to cause the one or more processors to:
   receive, from a front-end device communicatively coupled to the back-end device, one or more images of a bearing, wherein the front-end device includes at least one of a mobile device, a tablet, or a computer;
   identify one or more defects in one or more defect classes on the bearing based on the one or more images using a deep learning classifier, wherein the deep learning classifier is trained on training data including a plurality of images of training bearings, wherein at least some of the plurality of images of the training bearings include defects known to be associated with the one or more defect classes, wherein the training data includes an initial training dataset, wherein the deep learning classifier is trained using a semi-supervised learning technique comprising:

training the deep learning classifier with the initial training dataset;

applying the deep learning classifier to a batch of unlabeled data to generate pseudo-labeled data;

reviewing at least a portion of the pseudo-labeled data to generate reviewed data; and retraining the deep learning classifier based on the reviewed data;

generate defect data associated with at least one of the one or more defects identified on the bearing, wherein the defect data includes a mitigation technique for mitigating at least one of the one or more defects during a fabrication process of the bearing; and direct the front-end device to display the defect data on a display device.

2. The system for defect inspection of claim 1, wherein the defect data comprises:

a number of defects identified in at least one of the one or more defect classes.

3. The system for defect inspection of claim 1, wherein the defect data comprises:

an annotated image indicating at least locations of the defects identified on the bearing.

4. The system for defect inspection of claim 1, wherein the defect data comprises:

a probability of at least one of the one or more defects identified on the bearing belonging to at least one of the one or more defect classes.

5. The system for defect inspection of claim 1, wherein the defect data comprises:

a root cause associated with at least one of the one or more defects identified on the bearing.

6. The system for defect inspection of claim 1, wherein the deep learning classifier is trained with at least one of a supervised learning technique or a semi-supervised learning technique.

7. The system for defect inspection of claim 1, wherein the program instructions are further configured to cause the one or more processors to:

verify whether the one or more images meet one or more quality standards, wherein one or more test images include any of the one or more images that pass the one or more quality standards;

wherein identify the one or more defects in the one or more defect classes on the bearing based on the one or more images using the deep learning classifier comprises:

identify the one or more defects in the one or more defect classes on the bearing based on the one or more test images using the deep learning classifier.

8. The system for defect inspection of claim 7, wherein at least one of the one or more quality standards comprise:

an image quality standard associated with at least one of contrast or blur.

9. The system for defect inspection of claim 7, wherein at least one of the one or more quality standards comprise:

an object detection check.

10. The system for defect inspection of claim 9, wherein detection of a face results in failure of the object detection check.

11. The system for defect inspection of claim 1, wherein at least one of the one or more defect classes comprises:

at least one of cracking, discoloration, false brinelling, fretting, indentation, pitting, rust, spalling, wear, or an overheating defect.

12. A system for defect inspection comprising:

one or more processors configured to execute program instructions stored in a non-transitory memory device, wherein the program instructions are configured to cause the one or more processors to:

receive one or more images of a bearing from a user via a user interface communicatively coupled with the one or more processors;

verify whether the one or more images meet one or more quality standards, wherein one or more test images includes any of the one or more images that pass the one or more quality standards;

identify one or more defects in one or more defect classes on the bearing based on the one or more test images using a deep learning classifier, wherein the deep learning classifier is trained on training data including a plurality of images of training bearings, wherein at least some of the plurality of images of the training bearings include defects known to be associated with the one or more defect classes, wherein the training data includes an initial training dataset, wherein the deep learning classifier is trained using a semi-supervised learning technique comprising:

training the deep learning classifier with the initial training dataset;

applying the deep learning classifier to a batch of unlabeled data to generate pseudo-labeled data:

reviewing at least a portion of the pseudo-labeled data to generate reviewed data; and retraining the deep learning classifier based on the reviewed data;

generate defect data associated with at least one of the one or more defects identified on the bearing, wherein the defect data includes a mitigation technique for mitigating at least one of the one or more defects during a fabrication process of the bearing; and cause the defect data to be displayed on a display device.

13. A method for defect inspection comprising:

capturing, via a front-end device accessible to a user, one or more images of a bearing, wherein the front-end device includes at least one of a mobile device, a tablet, or a computer;

identifying, with a back-end device including a server, one or more defects in one or more defect classes on the bearing based on the one or more images using a deep learning classifier, wherein the deep learning classifier is trained on training data including a plurality of images of training bearings, wherein at least some of the plurality of images of the training bearings include defects known to be associated with the one or more defect classes, wherein the training data includes an initial training dataset, wherein the deep learning classifier is trained using a semi-supervised learning technique comprising:

training the deep learning classifier with the initial training dataset;

applying the deep learning classifier to a batch of unlabeled data to generate pseudo-labeled data;

reviewing at least a portion of the pseudo-labeled data to generate reviewed data; and retraining the deep learning classifier based on the reviewed data;

generating, with the back-end device, defect data associated with at least one of the one or more defects identified on the bearing, wherein the defect data includes a mitigation technique for mitigating at least one of the one or more defects during a fabrication process of the bearing; and causing the defect data to be displayed on a display device on the front-end device.

14. The method of claim 13, wherein the defect data comprises:

at least one of:

a number of defects identified in at least one of the one or more defect classes;

an annotated image indicating at least locations of the defects identified on the bearing;

a probability of at least one of the one or more defects identified on the bearing belonging to at least one of the one or more defect classes;

a root cause associated with at least one of the one or more defects identified on the bearing; or a mitigation technique for mitigating fabrication of at least one of the one or more defects identified on the bearing.

15. The method of claim 13, wherein the deep learning classifier is trained with at least one of a supervised learning technique or a semi-supervised learning technique.

16. The method of claim 13, further comprising:

verifying whether the one or more images meet one or more quality standards, wherein one or more test images includes any of the one or more images that pass the one or more quality standards;

wherein identifying the one or more defects in the one or more defect classes on the bearing based on the one or more images using the deep learning classifier comprises:

identifying the one or more defects in the one or more defect classes on the bearing based on the one or more test images using the deep learning classifier.

17. The method of claim 13, wherein at least one of the one or more defect classes comprises:

at least one of cracking, discoloration, false brinelling, fretting, indentation, pitting, rust, spalling, or an overheating defect.

* * * * *